May 25, 1965     H. LANZENBERGER     3,185,038
CLAMPING DEVICE
Filed Oct. 31, 1962
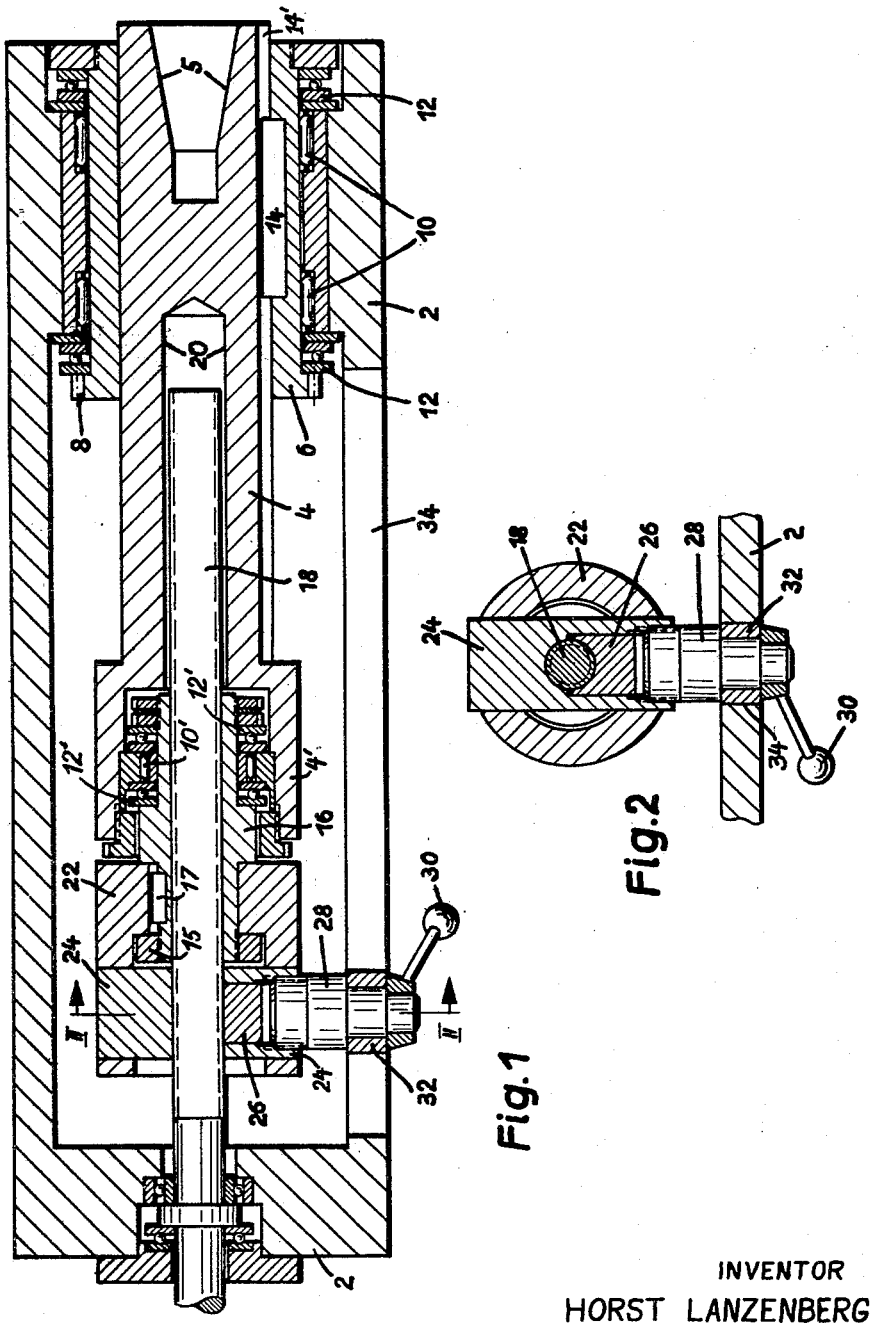
INVENTOR
HORST LANZENBERGER
BY
*Rupert J. Brady*
ATTORNEY

United States Patent Office 3,185,038
Patented May 25, 1965

3,185,038
CLAMPING DEVICE
Horst Lanzenberger, Munich, Germany, assignor to Hans Deckel, Munich, Germany, and Friedrich Wilhelm Deckel, Zug, Switzerland
Filed Oct. 31, 1962, Ser. No. 234,412
Claims priority, application Germany, Nov. 2, 1961, D 37,371
5 Claims. (Cl. 90—16)

The invention relates broadly to a clamping device and more particularly to a clamping device for a machine tool spindle.

More specifically the invention relates to a clamping device for a machine tool spindle which is supported and displaced in axial direction along a coaxially disposed threaded transport spindle having a non-self-locking thread by means of a transport nut rotatably connected with the machine tool spindle but axially non-displaceable therewith. The transport nut may be connected with the rotating machine tool transport spindle either directly or through a spindle sleeve.

Axial feed of a machine tool spindle is normally effected in two different ways. Either the threaded spindle is held fast in the spindle housing and the transport nut is set in rotation to axially displace the machine tool spindle connected therewith, or, as is the usual practice, the nut is secured against rotation and guided in the spindle housing for axial displacement and the tool spindle is displaced by rotation of the threaded spindle.

In order to carry out milling operations and the like with extendible tool spindles, the tool spindle must be rigidly clamped in the spindle housing. Known machines of the prior art accomplish the clamping by use of a track extending parallel to the transport spindle on which a clamping piece connected with the transport nut of the tool spindle is clamped. This type of clamping, however, burdens the working spindle with a bending moment which corresponds to the axial working pressure of the spindle and to the distance of the clamping point from the transport spindle.

For very precise work, requiring machining accuracies of a few thousandths of a millimeter, this type of clamping necessitates tracks, clamping parts, and spindle laid out extremely rigid and accurately. Further there results the disadvantage that the clamping must withstand the entire axial working pressure, and this necessitates a correspondingly high clamping force and hence track load.

One of the objects of the invention is to provide a clamping device for tool spindles which is simple and compact in construction and economical to manufacture.

Another object of the invention is to provide a construction of clamping device for tool spindles which does not transfer a bending moment to the transport spindle.

Another object of the invention is to provide a construction of clamping device for tool spindles which clamps directly on the threaded transport spindle and requires less clamping pressure than existing type clamping devices.

Still another object of the invention is to provide a device for selectively clamping a tool spindle directly to a threaded transport spindle which does not damage or cause objectionable wearing of the transport spindle.

A further object of the invention is to provide a construction of clamp for directly clamping a tool spindle to a threaded transport spindle in which the clamping force imparting portion also serves to prevent rotation of the transport and controlling the axial displacement of the tool spindle.

Other and further objects of the invention are set forth more fully in the specification hereinafter following and will become evident from the description of the device by reference to the accompanying drawing, in which:

FIG. 1 is a longitudinal sectional view through a spindle head of an extendible working spindle, incorporating the clamping device of the invention; and FIG. 2 is a transverse sectional view through the clamping device of the invention, taken substantially along line II—II in FIG. 1.

In the drawings, wherein for the purpose of illustration is shown a preferred embodiment of the invention, attention is directed first to FIG. 1, wherein is shown the housing 2 of a machine tool spindle head having an extendible working spindle 4 projecting from one end thereof with a recessed cone portion 5 for receiving a tool provided in the projecting end of the working spindle. The working spindle 4 is mounted for axial displacement in spindle bushing 6 by means of a fitting key 14 and slot 14′ connection which prevents relative rotation between members 4 and 6. Spindle bushing 6 is mounted for rotation in the housing 2 by means of needle bearings 10 and is retained from axial displacement therein by thrust bearings 12. The spindle bushing 6 carries a toothed rim 8 thereon which is disposed in meshing engagement with a transmission gear (not shown) for imparting rotative motion to spindle bushing 6 and working spindle 4, for drilling, milling, or like operation, when a driving force is imparted to the transmission gear.

At its rear end 4′ opposite the recessed cone portion 5, located in the spindle head housing 2, the working spindle carries a transport nut 16 rotatably connected thereto in coaxial alignment but retained from relative axial displacement therewith by means of needle bearings 10′ and thrust bearings 12′. A coarse threaded transport spindle 18 is undisplaceably and rotatably mounted in housing 2 in conventional manner, and is disposed in screw threaded engagement with transport nut 16 guided in housing 2, which is secured against rotation by means to be described. Upon rotation of transport spindle 18, by means not shown, transport nut 16 is axially displaced along spindle 18 and since working spindle 4 is connected to nut 16 through the arrangement of bearings 10′ and 12′ it is axially displaced in unison with nut 16. Spindles 4 and 18 and nut 16 are concentrically arranged as shown. To permit a long displacement path, the working spindle 4 is provided with an axial bore 20 so that the transport spindle can be telescoped into the working spindle 4 when the latter is retracted into housing 2.

In order to be able to fix the working spindle 4 axially at any desired point, for instance for carrying out milling operation, a cylindrical member 22 is rigidly connected with the transport nut 16, by means of threaded member 15 and key 17, and is disposed in surrounding relation with transport spindle 18. Aligned openings are provided through the side walls of cylindrical member 22 along an axis normal to the axis of spindle 18 and a clamping piece 24 having an axial bore therein and a slot therethrough with a smooth semi-cylindrical clamping face at the base thereof for engaging a perimeter portion of spindle 18 is slidably engaged through the aligned openings. In the axial bore of the clamping piece 24 are mounted the slidable counter clamping piece 26 having a smooth semi-cylindrical clamping face for engaging an oppositely disposed perimeter portion of spindle 18, and a pin member 28, which is screwed by its thread into the axial bore of clamping piece 24. The outer end of pin member 28 is provided with a hand lever 30 and the inner end is in operative engagement with the counter clamping piece. When the hand lever 30 is operated and thus the pin member 28 rotated and advanced inwardly of the bore of clamping piece 24, semi-cylindrical clamping faces of the two clamping pieces 24 and 26 are moved into contact with the perimeter of transport spindle 18 such as to tightly clamp the spindle therebetween and arrest rotation thereof to prevent further axial displacement of nut 16 and working spindle 4 in the housing 2. With this arrangement spindle 24 is axially undisplaceable in housing 2 but can be rotated through the toothed rim 8 of spindle housing 6, due to the bearings 10, 12, 10' and 12' to carry out a milling operation or the like.

As previously stated nut 16 is secured against rotation in housing 2 and this is accomplished by the shank of clamping pin member 28 which is provided with a surrounding guide ring member 32 which is disposed in sliding guided engagement in longitudinal track or slot 34 through housing 2. With this arrangement the part for guiding and retaining the nut from rotation is designed as the part producing the clamping force in the nut or clamping device. For straight conduction in the housing the nut must have a radial prolongation which in this case is advantageously designed at the same time so that it can produce the clamping force in the nut when actuated by a hand lever.

The advantage of clamping the transport nut 16 and thus the working spindle 4 directly to transport spindle 18 is that the component of the axial machining pressure, which is normal to the thread flanks of the threaded spindle 18, rests directly on the thread turns and only the component in the direction of the thread turns must be held by the clamping force to secure the spindles together. Therefore, the necessary clamping force required in the device of the invention is equal to the axial force multiplied by the sine of the pitch angle of the thread turns, minus the angle of friction between nut 16 and spindle 18. The required clamping force, therefore, especially at low pitch angles, is much smaller than in the known machines of the prior art. Moreover, the bending moment from the eccentric position of the known clamping devices of the prior art, as previously mentioned, is absent in the clamping device according to the present invention. The axial track 34 of the nut 16 needs to absorb only the forces which are produced during the advance of the tool spindle 4, to prevent a rotational movement of the nut. To bring about clamping, if the nut is designed in two parts, for example, the two parts may be rotated relatively to each other.

The load on the threaded spindle 18 is heaviest during axial feed (drill feed) of the working spindle 4. Due to the relative movement between nut and spindle under high load, the thread flanks are subject to heavy wear. In the course of time this affects the accuracy of machining. In order not to increase the wear further by additional clamping forces, in the past one has avoided the direct clamping of the nut on the threaded spindle in the known machines of the prior art and has accepted the disadvantages connected therewith. Contrary to this widespread view, however, the additional wear occurring due to clamping directly to spindle 18 has been found to be very little, because the load is a dynamic load causing wear only at the moment of clamping, with much smaller clamping force than in known machines. After the clamping is accomplished the load is static, so that further wear cannot occur.

To be gentle on the transport thread portion of the nut 16, according to a further characteristic of the invention, the clamping force is transmitted to the threaded spindle 18 in a section of the nut which does not serve for the axial transport of the working spindle 4. In this way, the part 16 of the nut which serves for the transport or axial displacement of the working spindle is functionally separated from the part 22, which transmits the clamping force from the nut to the threaded spindle. Thereby the wear and hence the inaccuracies of the feed transmission, which increase with the age of the machine, can be reduced.

The transport spindle thread flanks are subject to heavy wear during the drill feed. To keep them free from additional stress due to the clamping, the clamping part 22 of the nut is advantageously provided with smooth cylindrical clamping faces, as previously described, so that the entire clamping force is transmitted at the addendum circle faces of the threaded spindle 18 that is at the outer peripheral surfaces of the threaded spindle. By this design, the advantage of eccentric clamping, namely the protection of the transport spindle thread, is achieved by simple means, without having to accept at the same time the disadvantages thereof.

These addendum circle faces on the perimeter of spindle 18, however, tolerate only a relatively small pressure per unit area in order not to be deformed. Thus, at high axial forces, a great axial expansion is necessary for the clamping section of the nut. To keep this length small and yet to keep the thread flanks free from clamping forces, the clamping section 24, 26 of the nut is, in another embodiment of the invention, provided with a thread whose thread flanks do not touch the flanks of the threaded spindle 18, but whose pitch, addendum circle (outer thread diameter), and dedendum circle (diameter at base of threads) have the same dimensions as the pitch, addendum circle (outer thread diameter), and dedendum circle (diameter at base of threads) of the threaded spindle. With this arrangement the clamping forces are transmitted both at the addendum circles and at the dedendum circles of the thread turns, that is, the available clamping surface is increased by the surface of the dedendum circles. To prevent the thread flanks of the nut from applying against those of the spindle, the former must have a smaller flank angle than the latter such that the axial width of the outer surfaces of the threads on the clamping pieces 24 and 26 is less than the axial width of the outer surfaces of the threads on the spindle 18 which engage the dedendum circles of the clamping pieces 24 and 26. The thread flanks of the nut do not need accurate machining in the clamping section as they have no axial displacement function.

While I have described my invention in one of the preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A device of the character described comprising, an axially displaceable machine tool spindle, a threaded spindle mounted for rotation relative to said machine tool spindle carrying a non-self-locking thread thereon and disposed coaxially with said machine tool spindle, a nut rotatably connected with said machine tool spindle and threadably engaged with said threaded spindle for axial displacement thereon with said machine tool spindle upon rotation of said threaded spindle, and means connected with said nut for rigidly clamping said nut on said threaded spindle at selected axial positions.

2. In a machine tool, a spindle housing, a transport spindle mounted for rotation in said housing about its longitudinal axis, and carrying a non-self-locking thread thereon, a machine tool spindle disposed coaxially with said transport spindle, a nut rotatably connected with said machine tool spindle and engaged with the thread of said transport spindle for axial displacement thereon with said machine tool spindle upon rotation of said transport spindle, clamping pressure producing means carried by said nut and engageable with said transport spindle for locking said nut thereon, a guide carried by said housing parallel to the longitudinal axis of said transport spindle, and said clamping pressure producing means connected for movement in said guide when the transport spindle is rotated, whereby the member guiding the nut is also used for locking the nut on the transport spindle.

3. A device of the character described in claim 1 in which said means for clamping said nut on said threaded spindle is connected in a section of said nut axially removed from the section threadably engaged with said threaded spindle for the axial displacement of said machine tool spindle.

4. A device as set forth in claim 3 in which said means includes cooperating clamping members disposed about said threaded spindle and having smooth cylindrical clamping faces thereon for movement into clamping engagement with said threaded spindle.

5. In a machine tool, an axially displaceable machine tool spindle, a threaded spindle mounted for rotation having a non-self-locking thread thereon with a set pitch, addendum circle, dedendum circle and thread flanks joining said circles, said threaded spindle disposed coaxially with said machine tool spindle, a nut rotatably connected with said machine tool spindle and having a portion engaged with the thread of said threaded spindle for axial displacement thereon with said machine tool spindle upon rotation of said threaded spindle, and clamping means carried by another portion of said nut for locking said nut on said threaded spindle, said clamping means having a thread thereon of the same pitch, addendum circle and dedendum circle dimensions as the thread of said threaded spindle movable into clamping contact with said threaded spindle and having thread flanks which do not contact said thread flanks of the threaded spindle in clamped position.

References Cited by the Examiner
UNITED STATES PATENTS

| | | | |
|---|---|---|---|
| 1,028,600 | 6/12 | Pedrick | 77—34.4 X |
| 1,241,258 | 9/17 | Hawthorne. | |
| 1,946,214 | 2/34 | Kabigting | 77—34.4 |
| 2,367,292 | 1/45 | LeTourneau | 77—34.7 X |
| 2,796,767 | 6/57 | Carpenter | 77—34.4 X |
| 3,103,827 | 9/63 | Logan | 74—424.8 |

FOREIGN PATENTS 106,367  11/99  Germany.

WILLIAM W. DYER, Jr., *Primary Examiner.*